Patented Mar. 5, 1946

2,395,938

UNITED STATES PATENT OFFICE 2,395,938

MANUFACTURE OF SIRUP

George T. Peckham, Jr., Clinton, Iowa, assignor to Clinton Company, Clinton, Iowa, a corporation of Iowa No Drawing. Application May 28, 1942, Serial No. 444,933

4 Claims. (Cl. 127—38)

This invention relates to the production of sirup made by a partial conversion of starch and particularly to sirups having a greater sweetness than has heretofore been customary in sirups having the same dextrose equivalent.

For many years sirups have been produced from starch by subjecting starch in the presence of moisture and heat, and generally under pressure to the hydrolyzing action of acids such as HCl. The conversion procedure employed in making these sirups is generally similar to that used in converting starch for the production of crystalline dextrose except that the conversion is not allowed to proceed as far. In sirup conversions the extent of the conversion will vary in accordance with the amount of reducing sugars desired by the customer for any particular commercial use of a sirup. During conversions, some of the starch is changed to dextrose, some to maltose, and the remainder to various dextrins and other intermediate products. In general the conversion is stopped before enough dextrose is formed to cause crystallization to take place after the sirup has been standing for a time. Sirups of a low degree of conversion (for example, below 45 D. E.) are bland and not particularly sweet. Sweeter sirups have been made heretofore having a dextrose equivalent of as high as 60 or slightly higher.

Heretofore in processes for making sirups of increased sweetness by means of higher acid conversions, two difficulties have been encountered; (1) the tendency for crystallization of dextrose in the finished product upon storage; and, (2) the development of a slight bitter flavor, usually attributed to reversion products resulting from the over-conversion of the sugars. For some commercial uses the slight bitter taste has been unobjectionable, but there are commercial uses and needs for which it is desirable to have the degree of sweetness attainable in the more highly converted sirups but in which the elimination of the bitter taste is essential.

In the past, a conventional method of making sirups from corn starch has been to combine an aqueous suspension of corn starch and a solution of HCl in a converter into which steam is introduced until there is attained a pressure which may vary from 30 to 40 pounds in accordance with the objectives or preference of the individual operator. The temperature at which conversion takes place may be varied by varying the steam pressure. Also the length of the treatment may be varied and the amount of acid may be varied to produce different degrees of conversion of starch into dextrose and other conversion products. When the conversion has been completed to the desired degree, the contents of the converter tank have generally been discharged into an open neutralizer tank where an alkali such as sodium carbonate is then added in such proportion as to raise the pH of the converter liquor from the neighborhood of about 2.0 to approximately the ultimate desired pH of the liquor, that is around 4.5 to 5.0 pH. It has been customary to add only the amount of alkali required for that change in pH and to add this alkali at such a time or at such a rate that the contents of the neutralizer tank are always maintained below 6 pH and usually below 5 pH. In order to produce sirups in the higher range of dextrose equivalents, such as 50% dextrose equivalent or higher, the extent of the conversion has been increased and regulated to accomplish that result, either by increasing the time element, the temperature, the amount of acid used, or any combination of these three factors. While increased conversion has increased the sweetness of such sirups, this desired result has heretofore invariably been accompanied by a slight bitterness in the finished sirup which is more pronounced the higher the conversion has been carried.

The greater sweetness produced in the higher dextrose equivalents has been a sufficient advantage in many industrial uses to more than offset the increased bitterness, as compared with the less sweet sirups which are more bland and have little noticeable bitterness. Efforts have been made in the past to counteract or eliminate this increased bitterness in the sweet sirups but numerous difficulties have been encountered.

The present invention provides an improved method of manufacturing non-bitter sirups with greater sweetness than is found heretofore in sirups of similar dextrose equivalents and made by prior processes. While the conventional technique of conversion practice with its variations is employed in this invention, I improve the sweetness of the final product by a new technique in the treatment of the converter liquor after conversion. I have found that after the usual acid conversion has been carried far enough, if the liquor thereafter be temporarily subjected to an alkaline treatment at a pH considerably above the final desired pH of the sirup a very noticeable improvement in the final sweetness is attained without attendant development of bitterness.

A preferred manner of practicing this invention will herewith be illustrated by the following detailed example. An aqueous corn starch suspension of about 2200 gallons having a density of about 23.5 Bé. is measured into a starch tank. 48 pounds of 18° Bé. muriatic acid, approximately 28% HCl are mixed with 200 gallons of water and introduced into the converter. Steam is applied to the converter and when the acid solution is boiling, the starch suspension is introduced into the converter at a rate sufficiently slow so that boiling in the converter is continuously maintained. The foregoing procedure is a conventional sirup conversion practice.

After all of the starch slurry has been drawn into the converter, all of the openings of the latter are closed and the steam pressure therein is allowed to build up to about 32 pounds. The conversion is allowed to continue for a sufficient period of time to permit the contents to hydrolyze to a dextrose equivalent of the desired degree. In the illustrative example, conversion is allowed to continue until a dextrose equivalent of about 50% is obtained.

As soon as the desired dextrose equivalent is attained, the valve in the discharge line of the converter is opened and the pressure in the converter will be used to force the contents into an open neutralizer tank. In equipment of the size customarily used for a batch of this quantity, the transfer of the material from the converter to the neutralizer will take several minutes; in the specific example given, 6½ minutes is required and during this time, conversion continues, to give a final dextrose equivalent of about 55%. As thus far described the process and equipment described are conventional.

Simultaneously with the beginning of the introduction of the converter contents into the open neutralizer tank a previously measured quantity of sodium carbonate solution is drawn into the neutralizer tank. Enough of the sodium carbonate is employed to bring about a final pH of about 4.5. The soda ash should be introduced rapidly, that is, in approximately one minute or less, in the specific example. This is a departure from the conventional neutralizing practice in the manufacture of sirup. Heretofore, it has been customary to introduce the soda ash gradually as the converter contents are being gradually introduced into the neutralizer tank. It has been the practice to regulate the addition of the soda ash so that about seven or eight minutes was required to introduce it, with the result that the contents of the neutralizer gradually rise in pH from the original pH of the converter contents, which is approximately 1.8 to 2.0, to the final desired pH of the finished neutralizer liquor, which usually lies within the range of 4.2 to 5.0. In the prior practice, during the addition of the soda ash, the pH at no time exceeded the final pH, or if it did, then not by design nor to any great extent.

However, in accordance with the present invention, the rapid introduction of all of the sodium carbonate solution during the first minute causes the liquor in the neutralizer to attain a pH of around nine by the end of the first minute, and as further converter liquor is added the pH of the tank contents gradually drops and when the operation is completed the final desired pH of around 4.5 will be attained.

In the first half of the period during which the converter liquor is being introduced into the neutralizer tank, the alkali is present in such excess that the pH will range from about 9 to about 7, in the example given, and will still remain considerably above 6 until the last minute when the last few per cent of the batch of liquor is being introduced into the tank, at which time it drops down to between 4.5 and 5.0.

While it appears to be a paradox to assert that the batch of liquor is temporarily subjected to an alkaline treatment at a pH above 6 and even above 7 pH while using only that amount of soda ash required to neutralize all of the batch from about 2.0 pH to 4.5 pH, nevertheless this result is obtained when the above described procedure is followed. That is, the entire batch of converter liquor, excepting for the last few per cent introduced into the neutralizer tank, will be treated with alkali at a pH range of about 7 to 9.

It should be understood that in the old practice of neutralizing converter liquors and in the present invention, thorough agitation of the liquor in the neutralizer tank should be maintained mechanically or otherwise, so that the pH throughout the tank will be substantially uniform at any time.

After the alkaline treatment and final neutralization of the liquor is completed, the other treatments of the sirup liquor thereafter will be conducted in any normal and conventional manner usually employed in the industry for the finishing of sirups from that point on. For example, the liquor is mechanically filtered to remove the suspended impurities, it is then concentrated under vacuum to about 29° Bé., treated with activated vegetable carbon at about 150° F., or bone char. After the carbon treatment, a final mechanical filtration may be employed to insure the elimination of carbon from the finished product. The liquor thus clarified will then be concentrated to the proper density required by the market, which may vary from 41° to 45° Bé. as the customer may desire.

It should be noted that the above described alkaline treatment of the converter liquor under alkaline conditions takes place at the temperatures which the liquor retains when coming from the convertor tank, which may vary from boiling down to about 150° F. Whatever effects on color increase or modifications of the sugar may occur during the alkaline treatment these are terminated when the final neutrality of about 4.5 to 5.0 pH is reached. The speed with which this point may be reached, in other words, the duration of the alkaline treatment may be varied somewhat, but excessive effects resulting from prolongation of the treatment are to be avoided.

While sodium carbonate is mentioned as the alkali used in the foregoing example, other alkalis such as sodium hydroxide, potassium hydroxide, and potassium carbonate may be used in place of the sodium carbonate.

It should be understood that the scope of the invention is not limited to the precise details of the illustrative example. Sirups having other dextrose equivalent contents may be produced in accordance with this invention; likewise the practice of the invention is not limited to densities, temperatures, or the exact pH control above specified.

The finished sirup, made in accordance with this invention, will have considerably greater sweetness than would be possessed by sirups of equal dextrose equivalent produced by prior processes and will have no noticeable bitterness.

While corn starch is named above it should be understood that this invention comprehends the use of any commercially obtainable starch, including starch obtained from potatoes, wheat, rice, cassava, or other suitable sources.

As this invention is concerned only with sweet, not bland, sirups, it will preferably be applied to starch liquors which have been converted by acid hydrolysis to well above 45% dextrose equivalent, preferably from 50% to 60%, or even higher. Thus the finished sirups after treatment in accordance with this invention will have a very definite sweetness and no noticeable bitterness.

Having described my invention, I claim:

1. A method of manufacturing a stable starch conversion sirup of notable sweetness comprising converting a starch suspension by acid hydrolysis to form dextrose, maltose and other intermediate starch conversion products having a total dextrose equivalent content in excess of 50% but with insufficient dextrose to induce the crystallization thereof in the finished sirup product, treating the conversion solution at a temperature range of about 150° F. to boiling by introducing into a minor fraction of it the whole amount of alkali required for neutralizing the whole batch to about 5.0 pH whereby said fraction attains a pH above 7, thereafter gradually adding the remainder of the batch of liquor to said fraction to bring the whole batch finally to about 4.5 pH to 5.0 pH after about 6 to 8 minutes of alkaline treatment, and clarifying and evaporating the liquor for use as a sirup, the alkali employed for the alkaline treatment being selected from the group consisting of sodium carbonate, sodium hydroxide, potassium carbonate, and potassium hydroxide.

2. In the manufacture of starch conversion sirups by acid hydrolysis, the improvement consisting in segregating a quantity of un-neutralized starch conversion liquor immediately after conversion, adding thereto an alkali selected from the group consisting of sodium carbonate, sodium hydroxide, potassium carbonate, and potassium hydroxide in such proportion as to raise the pH of the liquor to a range between about 7.0 and 9.0 pH and thereafter gradually adding to said mixture enough more of the same starch conversion liquor to cause the entire mixture to attain a pH of about 4.5 pH to 5.0, the temperature of the liquor during the alkaline treatment being within a range of about 150° F. to boiling and the duration of the treatment about 6 to 8 minutes.

3. In the manufacture of starch conversion sirups of notable sweetness the improvement consisting in treating a segregated batch of un-neutralized starch conversion liquor having a dextrose equivalent content of over 50% produced by acid hydrolysis to such an excess of an alkali selected from the group consisting of sodium carbonate, sodium hydroxide, potassium carbonate, and potassium hydroxide as to raise the pH of said batch to a range between about 7.0 and 9.0, thereafter adding to said treated batch such a quantity of un-neutralized conversion liquor as to bring the pH of the entire batch to about 4.5 pH to 5.0, and clarifying the batch for finishing as a sirup, the temperature of the liquor during alkaline treatment being within the range of 150° F. to boiling and the duration of the treatment being about 6 to 8 minutes.

4. A method of manufacturing sirup comprising converting an aqueous starch solution by means of acid to form a conversion liquor having a dextrose equivalent content of about 50 per cent, and subjecting the converter liquor to a brief alkaline treatment by introducing into a minor fraction of the converter liquor the whole amount of sodium carbonate required for neutralizing to about 5.0 pH the whole batch, and thereafter gradually adding the remainder of the converter liquor to the mixture to reduce its pH from above 7.0 to about 4.5 pH to 5.0 pH, the temperature of the liquor during alkaline treatment being below boiling and the duration of the treatment about 6 to 8 minutes.

GEORGE T. PECKHAM, Jr.